US006911936B2

(12) United States Patent
Stayton et al.

(10) Patent No.: US 6,911,936 B2
(45) Date of Patent: Jun. 28, 2005

(54) FORMATION SURVEILLANCE AND COLLISION AVOIDANCE

(75) Inventors: Greg T. Stayton, Glendale, AZ (US); Kathryn W. Ybarra, Surprise, AZ (US); James R. Troxel, Glendale, AZ (US)

(73) Assignee: Aviation Communication & Surveillance Systems, LLC, Phoenix, AZ (US)

( * ) Notice: Subject to any disclaimer, the term of this patent is extended or adjusted under 35 U.S.C. 154(b) by 161 days.

(21) Appl. No.: 10/722,797

(22) Filed: Nov. 26, 2003

(65) Prior Publication Data

US 2004/0174295 A1 Sep. 9, 2004

Related U.S. Application Data

(63) Continuation of application No. 10/044,734, filed on Jan. 11, 2002, now Pat. No. 6,683,562, which is a continuation-in-part of application No. 09/909,578, filed on Jul. 20, 2001, now Pat. No. 6,657,578.

(51) Int. Cl.[7] .......................... G01S 7/04; G01S 13/74; G01S 13/93

(52) U.S. Cl. .......................... 342/182; 342/29; 342/30; 342/42; 342/46; 342/175; 342/176; 342/195; 701/200; 701/300; 701/301; 340/945; 340/961

(58) Field of Search .................... 342/29–51, 175–186, 342/195, 357.01–357.17; 340/945, 961, 971–980; 701/200, 300, 301, 302, 117

(56) References Cited

U.S. PATENT DOCUMENTS

| | | | | | |
|---|---|---|---|---|---|
| 3,900,846 | A | * | 8/1975 | Gibbon et al. | 342/37 |
| 4,162,494 | A | * | 7/1979 | Bacon | 342/181 |
| 4,899,161 | A | * | 2/1990 | Morin et al. | 342/180 |
| 5,459,469 | A | * | 10/1995 | Schuchman et al. | 342/37 |
| 5,570,095 | A | * | 10/1996 | Drouilhet et al. | 342/357.07 |
| 5,703,591 | A | * | 12/1997 | Tognazzini | 342/30 |
| 5,798,726 | A | * | 8/1998 | Schuchman et al. | 342/37 |
| 6,043,756 | A | * | 3/2000 | Bateman et al. | 340/945 |
| 6,208,284 | B1 | * | 3/2001 | Woodell et al. | 342/30 |
| 6,262,679 | B1 | * | 7/2001 | Tran | 342/29 |
| 6,271,768 | B1 | * | 8/2001 | Frazier et al. | 340/961 |
| 6,278,396 | B1 | * | 8/2001 | Tran | 342/29 |
| 6,459,411 | B2 | * | 10/2002 | Frazier et al. | 342/30 |
| 6,657,578 | B2 | * | 12/2003 | Stayton et al. | 342/30 |
| 6,683,562 | B2 | * | 1/2004 | Stayton et al. | 342/182 |
| 2002/0011950 | A1 | | 1/2002 | Frazier et al. | |

* cited by examiner

*Primary Examiner*—Bernarr E. Gregory
(74) *Attorney, Agent, or Firm*—William R. Bachand; Squire, Sanders & Dempsey L.L.P.

(57) ABSTRACT

A display system is disclosed for displaying air traffic symbology from a plurality of different types of air traffic surveillance systems on a single monitor. A display device includes a processor for generating display symbology from TCAS, SKE and ADS-B information, and a monitor for displaying the generated symbology in a uniform format.

9 Claims, 9 Drawing Sheets

FORMATION SURVEILLANCE AND COLLISION AVOIDANCE

PRIORITY

This is a continuation application and claims benefit under 35 U.S.C. § 120 from related, U.S. patent application Ser. No. 10/044,734 filed on Jan. 11, 2002, now U.S. Pat. No. 6,683,562 by Greg Stayton, et al; which is a continuation in part of Ser. No. 09/909,578 now U.S. Pat. No. 6,657,578 filed on Jul. 20, 2001 by Greg Stayton, et al.

BACKGROUND OF THE INVENTION

The invention relates to a traffic display for tracking aircraft; more particularly, but not exclusively, the invention relates to a display device for traffic surveillance and collision avoidance systems in formation aircraft.

Presently, most aircraft utilize systems that provide pilots information to avoid potential collisions in the air and/or on the ground. There are many varieties of collision avoidance systems (CAS) and conflict detection systems in aircraft that fall into the following general category: (1) passive systems; and (2) active systems. Active collision avoidance systems utilize transmission broadcasts from the aircraft to determine relevant information relating to other aircraft in the area, and/or provide its own relative information to other aircraft in an area. The most prevalent active system used in the U.S. today, is the Traffic Alert and Collision Avoidance System or "TCAS." (TCAS is internationally known as ACAS or Airborne Collision Avoidance System).

TCAS offers pilots of private, commercial and military aircraft reliable information to track traffic and avoid potential collisions with other aircraft. TCAS is a family of airborne devices that operate independently of the ground-based Air Traffic Control (ATC) systems. Since TCAS inception, three different control levels have evolved: TCAS I is intended for commuter and general aviation aircraft and provides a proximity warning only, assisting the pilot in visually acquiring intruder aircraft; TCAS II is intended for commercial airliners and business aircraft to provide pilots with traffic and resolution advisories in the vertical plane; and TCAS III, which has yet to be approved by the FAA, will purportedly provide resolution advisories in the horizontal as well as vertical plane.

TCAS detects the presence of nearby aircraft equipped with transponders that reply to ATCRBS Mode C or Mode S interrogations. When nearby aircraft are detected, TCAS tracks and continuously evaluates the potential of these aircraft to collide with its own aircraft.

For surveillance, TCAS interrogations are transmitted over an interrogation channel (e.g., 1030 MHz) from the TCAS equipped aircraft to any aircraft within the range of the transmission. The interrogation requests a reply from transponder-equipped aircraft within range of the transmission to provide their pertinent position and/or intent information. Transponder-equipped aircraft within range of the transmitted interrogation, reply over a reply channel (e.g., 1090 MHz) by providing their associated information. This information can include altitude, position, bearing, airspeed, aircraft identification and other information of the in-range aircraft to assist the TCAS in tracking and evaluating the possibilities of collision with the in-range aircraft.

Essentially, TCAS is a surveillance system and a collision avoidance system. For tracking nearby aircraft or "intruders," a symbol depicting the surrounding aircraft is displayed on traffic displays located in the cockpit. The displayed symbols allow a pilot to maintain awareness of the number, type and position of aircraft within the vicinity of his own aircraft.

For collision avoidance, TCAS predicts the time to an intruder's closet point of approach (CPA) and a separation distance at the CPA, by calculating range, closure rate, vertical speed and altitude. TCAS provides the capability of tracking other aircraft within a certain range, evaluating collision potential, displaying/announcing traffic advisories (TAs), and depending on the type of system used (e.g., TCAS II) recommending evasive action in the vertical plane to avoid potential collisions, otherwise known as a Resolution Advisories (RAs).

It should be noted that in certain circumstances aircraft may not be detected by TCAS, for example, aircraft not equipped with operating transponders cannot reply to interrogations; military aircraft equipped with identification friend or foe (IFF) systems operating in mode 4 do not reply to interrogations; and aircraft that may not hear interrogations for one reason or another (e.g., interference, lowering landing gear when intruder was being tracked by only the bottom antenna or interference limiting).

The Federal Aviation Administrations (FAA) set guidelines for collision, warning and caution areas for implementation of TCAS II. A volume of space defines these areas, and/or a time tau ($\tau$) to penetration of that space, around the TCAS equipped aircraft. Examples of a collision area 110, warning area 115 and caution area 150 of an aircraft 105 equipped with TCAS II, are illustrated in FIGS. 1A (top view) and 1B (perspective view). If oncoming aircraft 120 actually penetrates caution area 150 it may be designated as an intruder and a traffic advisory may be issued to the pilot or crew of TCAS equipped aircraft 105. The TA may consist of an audible warning and visual display indicating the distance and relative bearing to intruder 120. If an intruder 122 penetrates warning area 115, a resolution advisory may be issued to the crew or pilot of TCAS equipped aircraft 105. The RA may be corrective or preventive and may consist of instructions to climb or descend at a recommended vertical rate, or caution the pilot not to make changes in the present vertical rate.

The shapes, horizontal and vertical dimensions of the respective areas are a function of the range and closure rate of oncoming aircraft 120.

The time-space domain for TCAS interrogations is limited in that each interrogation-reply takes a certain period of time. When several different aircraft are interrogating in the same proximity, the amount of transponder replies can saturate the surrounding airspace and cause ATC tracking problems. To overcome this problem TCAS was designed with logic that, when a certain number of TCAS equipped aircraft are within a predetermined vicinity of each other, output power and processor interrogations are reduced. This is known as Interference Limiting. The reduction of output power effectively shortens the TCAS intruder tracking range. Low traffic density areas allow for increased transmission power whereas high traffic density areas (often called Terminal Control Areas "TCAs") require a reduced transmission power. For example, the TCAS of an aircraft flying over Western Kansas may have a 80 nm (nautical miles) interrogation range or longer, whereas an aircraft flying near Chicago may reduce its interrogation range down to 5 nm with greater link margin. The reduction of transmission power from a low density area to a high density area may be as much as 10 dB. This is done to reduce RF interference between other TCAS equipped aircraft and to reduce RF interference with ATC ground tracking stations.

Certain aircraft, typically military aircraft, frequently fly in multi-aircraft groups known as formations. A problem occurs when all planes in a given formation are actively interrogating with their TCAS. Notably, the TCAS of planes in and outside the formation may detect a seemingly high density of planes in a traffic area due to the formation and thus reduce the transmission power of their respective broadcasts and reduce their receiver sensitivity to compensate for the perceived density. This type of unnecessary range adjustment due to reduced transmission power and reduced receiver sensitivity is referred to as "Interference Limiting" and degrades collision avoidance safety to unacceptable levels (e.g., interrogation range is significantly decreased in areas where aircraft may be flying at high speeds). Even small formations of two or three TCAS enabled aircraft may result in Interference Limiting to non-formation and formation aircraft.

Honeywell (formerly Allied Signal) developed a collision avoidance system designed to specifically address military formation-flying insufficiencies of conventional TCAS; this system is known as Enhanced TCAS or "ETCAS." ETCAS provided means for military planes to fly in formation by offering a rendezvous-type feature in collision avoidance systems that would allow aircraft to be able to fly in a formation with other aircraft without generating RAs and TAs against one another.

However, ETCAS also generated significant Interference Limiting in non-formation aircraft. The FAA and civilian regulatory agencies of other countries severely restricted the use of TCAS, including ETCAS, during formation flying due to the resulting Interference Limiting problems. These restrictions essentially require several members in a formation to fly with their TCAS turned off, while one or a few aircraft in the formation are allowed to have their TCAS turned on. These restrictions were detrimental to the purpose of collision avoidance systems since many members of a formation have no indication of potential collision threats between themselves and non-formation aircraft as well as potential collisions threats between other members of the formation. Further, the restrictions on the use of TCAS during formation flying essentially negated any advantages of ETCAS.

The block diagram of FIG. 2 illustrates an example of Interference Limiting. As shown, a group of aircraft 210–215 are flying in formation 200 while TCAS equipped aircraft 220 is approaching formation 200. The wavy lines preceding an aircraft in FIGS. 1–3 illustrate transmission of TCAS broadcasts.

When the TCAS of aircraft 220 receives TCAS broadcasts (interrogations) from aircraft 210–214 in range of perimeter 260, and intruder tracks are formed on aircraft 210—214 within the TCAS of aircraft 220, the perceived high density of intruders 210—214 by TCAS of aircraft 220 may result in an automatic adjustment by the TCAS of aircraft 220 to a reduced surveillance range. (The reduction in the number and power of TCAS broadcasts is gradual and is not necessarily realized by a pilot or flight crew). An example of the shortened surveillance range is shown in FIG. 2 by reduced perimeter 261. Shortening the surveillance range 261 may be dangerous for aircraft flying at high speeds, as warning time and time to act on a resolution advisory may be significantly reduced.

Presently, under the requirements of the FAA and various other airworthiness authorities in several countries, only one or few aircraft in a formation is allowed to have an actively interrogating TCAS (referred to herein as "active TCAS".) If all the members in a formation are not interrogating, significant safety problems can arise. That is, the non-interrogating formation members will not be aware of potential collision threats between themselves and oncoming, non-formation aircraft because their respective TCAS is switched off. The non-interrogating members of the formation will also have no warning by their respective TCAS of potential collisions with other formation members.

SUMMARY OF THE INVENTION

The present invention substantially eliminates one or more of the problems associated with the prior art by providing air traffic surveillance and collision avoidance information that is displayed on an integrated display in each aircraft in a multiple aircraft formation. This is accomplished by networking surveillance information over a communications link between the formation aircraft having active systems and formation aircraft having passive systems. At least one member of the formation that is actively interrogating communicates surveillance information over a network to non-interrogating members of the formation. The networked surveillance information is provided to: (i) prevent collisions between formation aircraft and non-formation aircraft; (ii) prevent collisions between the member aircraft in a formation; (iii) prevent collisions between aircraft in a formation and between formation aircraft and non-formation aircraft; and (iv) display surrounding aircraft, including non-interrogating formation aircraft, on traffic displays of the aircraft in the formation.

BRIEF DESCRIPTION OF THE DRAWING

Additional aspects and advantages of the present invention will become apparent from the description of the invention with reference to the appended drawing, wherein like designations denote like elements and in which.

DETAILED DESCRIPTION OF THE PREFERRED EMBODIMENTS

The preferred embodiments of the invention are described below in reference to TCAS. However, the present invention is not limited to implementation with TCAS systems but may be equally applied to other types of surveillance and collision avoidance systems or air traffic management systems. According to certain aspects of the present invention a surveillance and collision avoidance system is provided having a passive mode. As used herein, "passive mode" means the system is not actively transmitting TCAS broadcasts, but still may be performing tracking and/or collision avoidance calculations based on information networked from other aircraft in the formation. Surveillance and collision avoidance systems in passive mode do not necessarily preclude transmission of SKE, ADS-B or "squitter" information. Conversely, a surveillance and collision avoidance system in "active mode" means that the system is actively performing surveillance by transmitting interrogations to solicit replies from transponders of nearby aircraft. Formation members having systems in active mode communicate surveillance information to formation members having systems in passive mode to provide information pertaining to current air/ground traffic.

Figure 3A:
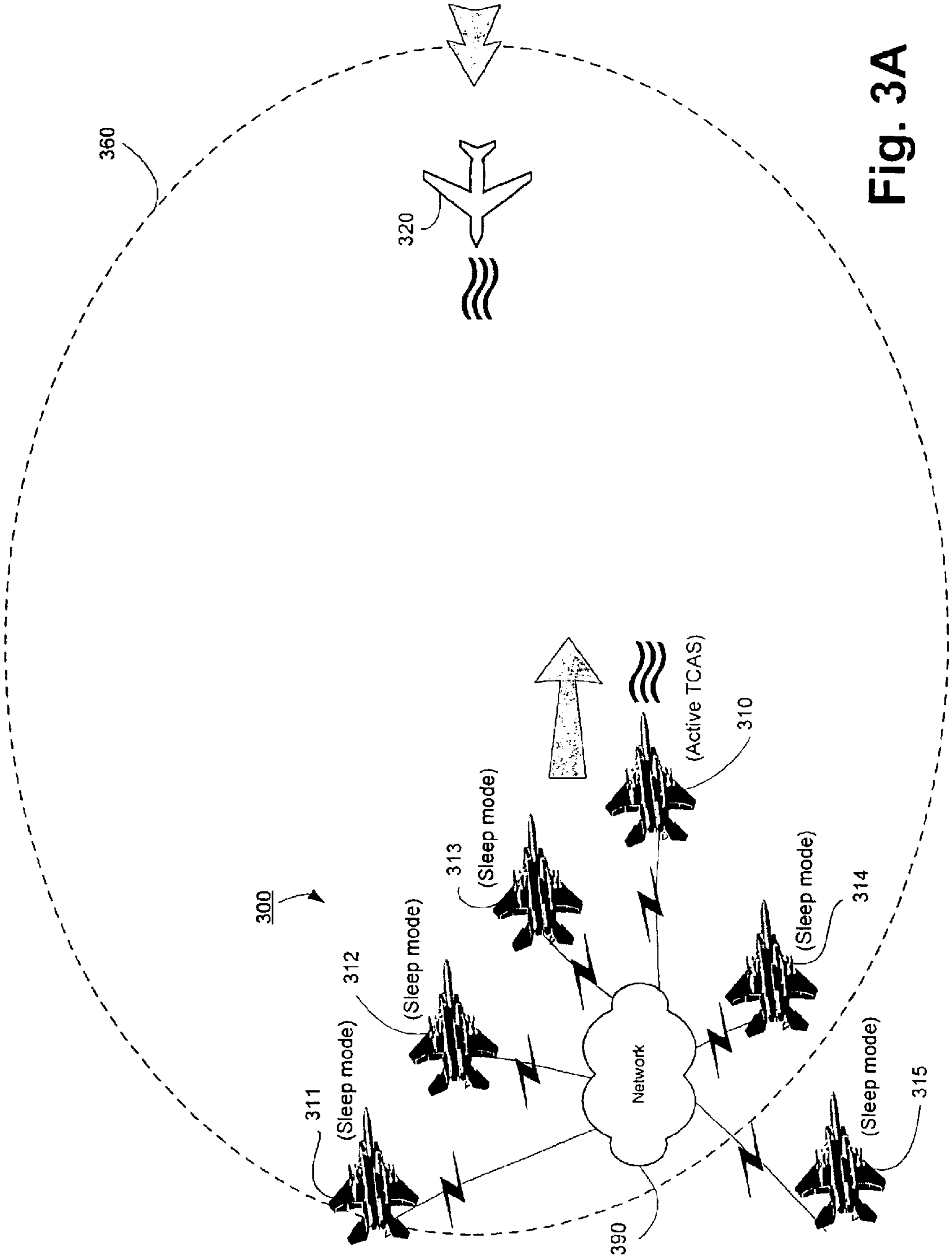
FIGS. 3A and 3B illustrating a formation of aircraft utilizing formation collision avoidance systems and methods according to a preferred embodiment of the invention.
Figure 3B:
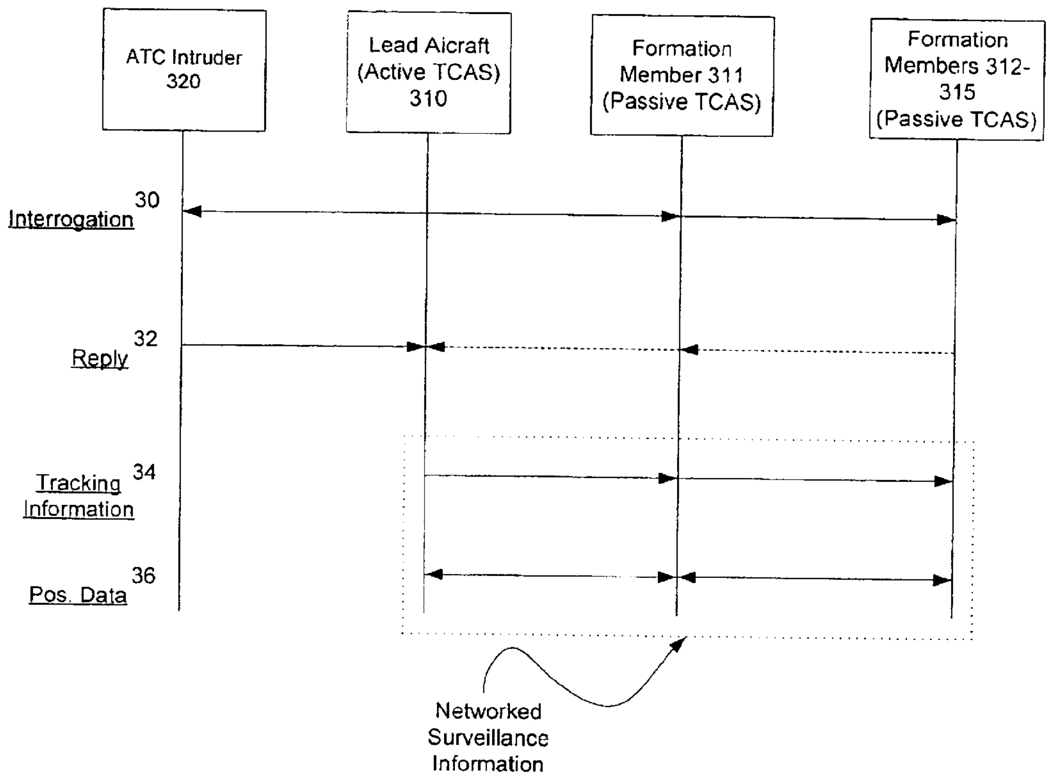

In a preferred embodiment of the invention, a wireless communications network is established between members in a formation. This network could be any suitable means of networking information including the use of ADS-B extended squitter transmissions. The wireless communications network enables formation members having systems in active mode and formation members having systems in passive mode to share data relating to current air/ground traffic and potential collision threats. As shown by the 20 examples in FIGS. 3A and 3B, lead aircraft 310 is the only member of formation 300 transmitting interrogations (shown by wavy lines in FIG. 3A) from a system in active mode; all other members 311–315 of formation 300 have their respective systems in passive mode. It should be recognized that the number of formation members having collision avoidance systems in active mode is a function of the overall size and number of aircraft in the formation and the restrictions imposed by the FAA and other authorities.

When lead aircraft 310 is actively transmitting interrogations 30 (FIG. 3B) or "interrogating," assuming aircraft 320 has some type of enabled transponder, aircraft 310 will receive a reply 32 (FIG. 3B) from aircraft 320 in response to the interrogation (lead aircraft may also receive replies from surrounding formation members 311–315 if the formation members do not have their transponders turned off). The reply from aircraft 320 includes the positional and other relevant information for situational awareness of aircraft 320. Additional information may be obtained from surrounding aircraft without need for interrogations (e.g., squitter and ADS-B information). Information obtained relating to surrounding air/ground traffic is collectively referred to herein as "tracking information" 34. The information of the reply 32 varies with the type of equipment and settings of the system used by aircraft 320. Types of transponders used in each aircraft may vary between, for example, Mode-A, Mode-C (often used for aircraft only utilizing Air Traffic Control Radar Beacon Systems or ATCRBS), and Mode-S transponders. The Mode S transponder "squitter" contains Mode S aircraft identification and altitude. Information on surrounding air traffic may also be provided or obtained using ADS-B (Automatic Dependent Surveillance-Broadcast) systems.

ADS-B is an automatic and periodic transmission of flight information from an aircraft that is similar to that of the current Mode S transponder squitter, but conveys more information. ADS-B systems typically rely on the satellite-based global positioning system to determine an aircraft's precise location in space. An aircraft equipped with ADS-B broadcasts its positional information and other data, including velocity, altitude, and whether the aircraft is climbing, descending or turning, type of aircraft and Flight ID (the Flight ID is a numeric and/or alphanumeric identifier uniquely assigned to identify each aircraft), as a digital code over a discrete frequency without being interrogated. Other aircraft and ground stations within roughly one hundred and fifty miles receive the broadcasts and display the information on a screen (e.g., Cockpit Display of Traffic Information or "CDTI").

The tracking information obtained by lead aircraft 310 may include the latitude, longitude, altitude, air speed, identification, ground speed and intent information for situational awareness of aircraft 320.

The TCAS of lead aircraft 310 may use this tracking information 34 to calculate if necessary, the range; relative altitude and relative bearing of aircraft 320 to determine a time to closure and potential collision threat based on its own flight information. The TCAS of lead aircraft 310 may also track aircraft 320 on its traffic display even when a potential collision threat does not exist.

The tracking information on aircraft 320 is then communicated from lead aircraft 310 over wireless network 390, to other members of formation 300. Positional data 36 relating to lead aircraft 310 may also be communicated to other members of formation 300 over wireless network 390. Those formation members that have their TCAS in passive mode (e.g., 311–315) use the communicated information to maintain situational awareness of surrounding ATC aircraft as well as situational awareness of other formation members. The communicated information may be used to generate traffic display symbology for display on formation members' traffic displays.

Figure 1A:
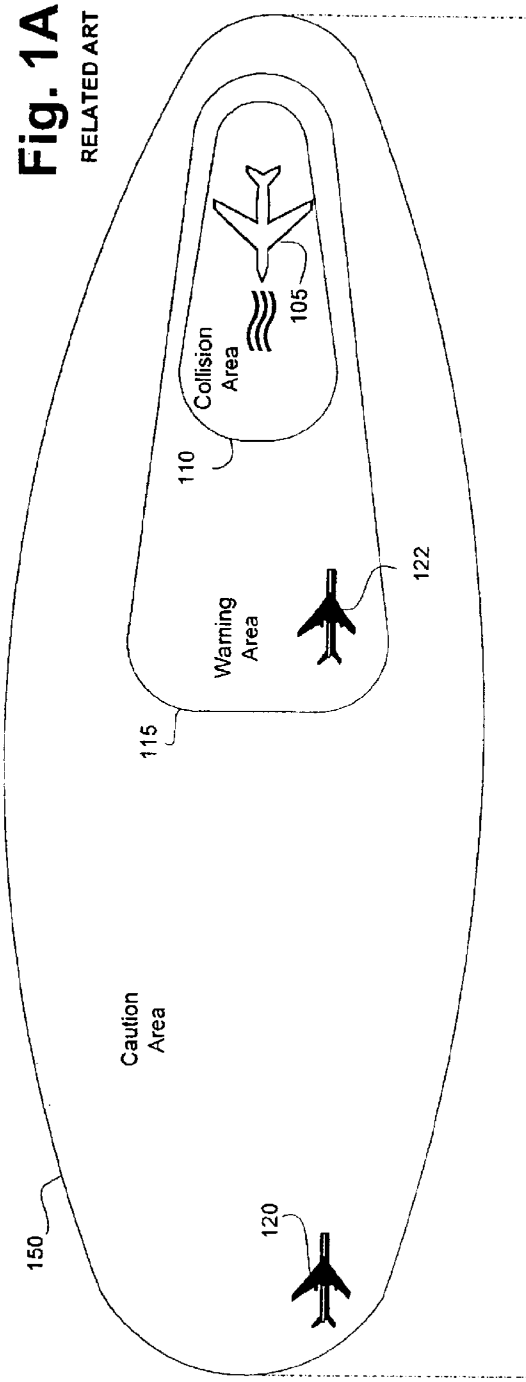
Fig. 1A RELATED ART
FIGS. 1A and 1B illustrate top and perspective views respectively, of caution, warning and collision areas for a collision avoidance system of the related art.
Figure 1B:
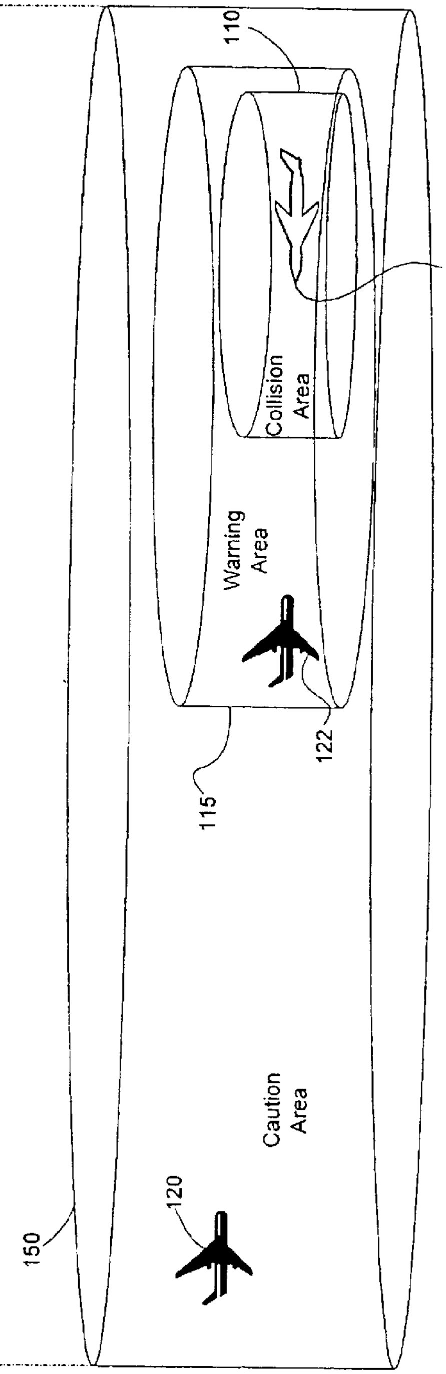
Fig. 1B RELATED ART
Figure 2:
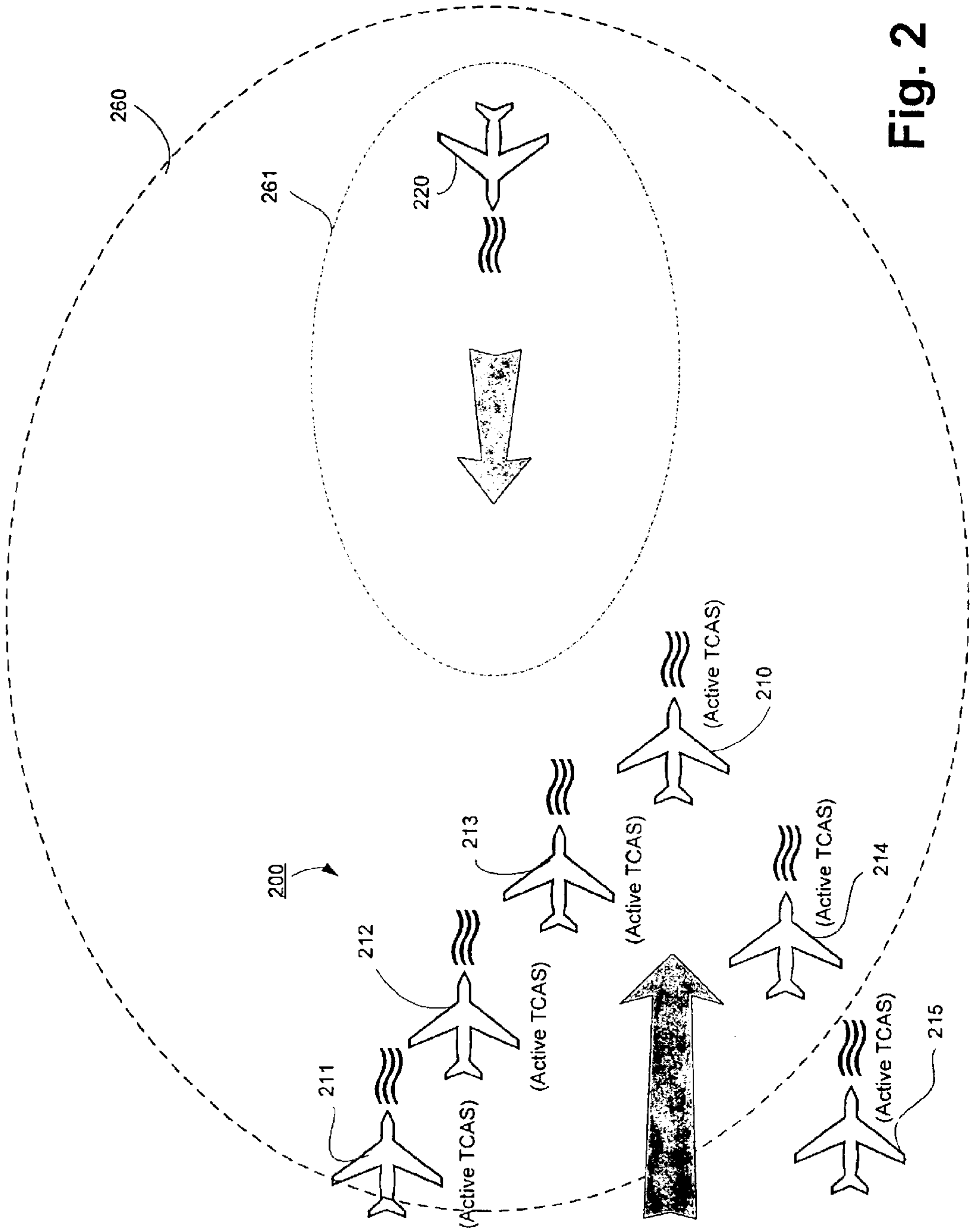
FIG. 2 is a block diagram illustrating interference limiting resulting from aircraft flying in a formation that are actively interrogating with their TCAS.

Formation members also use this communicated information to determine potential collision threats with other aircraft. Each formation member 310–315 preferably tracks the other members of formation 300, by exchanging positional data and identification information of each formation member. ADS-B, Mode S squitter and SKE information, or a combination thereof, broadcast by the formation members may be used to for this purpose depending upon the equipment in each formation aircraft. The information communicated between formation members is collectively referred to herein as "networked surveillance information." The members of formation 300 may track each other, as well as surrounding ATC aircraft, using the networked surveillance information. Networked surveillance information may be used by formation members to determine whether a potential collision threat exists between themselves and aircraft 320, between themselves and other members of the formation and/or for intruder and/or formation member tracking on their respective traffic displays. A potential collision threat may exist if aircraft 320 enters the perimeter of the caution area of any of formation members 310–315 (e.g., perimeter 150 illustrated in FIG. 1). However, the surveillance range of TCAS (in both active mode and passive mode), depending on the functionality and type of system used, may exceed the caution area shown in FIG. 1.

Passive tracking and determination of potential collision threats by formation members having TCAS in passive mode may involve determining a position of the formation member relative to actively interrogating aircraft 310 of the formation, and performing collision avoidance calculations using the determined relative position and networked surveillance information. The formation members having TCAS in passive mode may use the networked surveillance information to display air traffic without performing any collision avoidance calculations.

If a potential collision threat is determined by a TCAS in passive mode, at least three basic options are available: (1) the TCAS may automatically "wake up" from passive mode to active surveillance mode and begin active surveillance (e.g., interrogating) on its own; (2) the pilot or crew of the aircraft can be alerted that a potential collision threat exists and the pilot or crew can switch the TCAS from passive mode to active mode if desired; or (3) the TCAS may continue in passive mode but provide Traffic Advisories to the flight crew based on updated networked surveillance information of aircraft 320. RAs may also be provided by TCAS in passive mode, but without active surveillance, there may be no coordination of RAs between TCAS in passive mode and an intruder's TCAS. Any combination of the foregoing options may be implemented as well.

Figure 4:
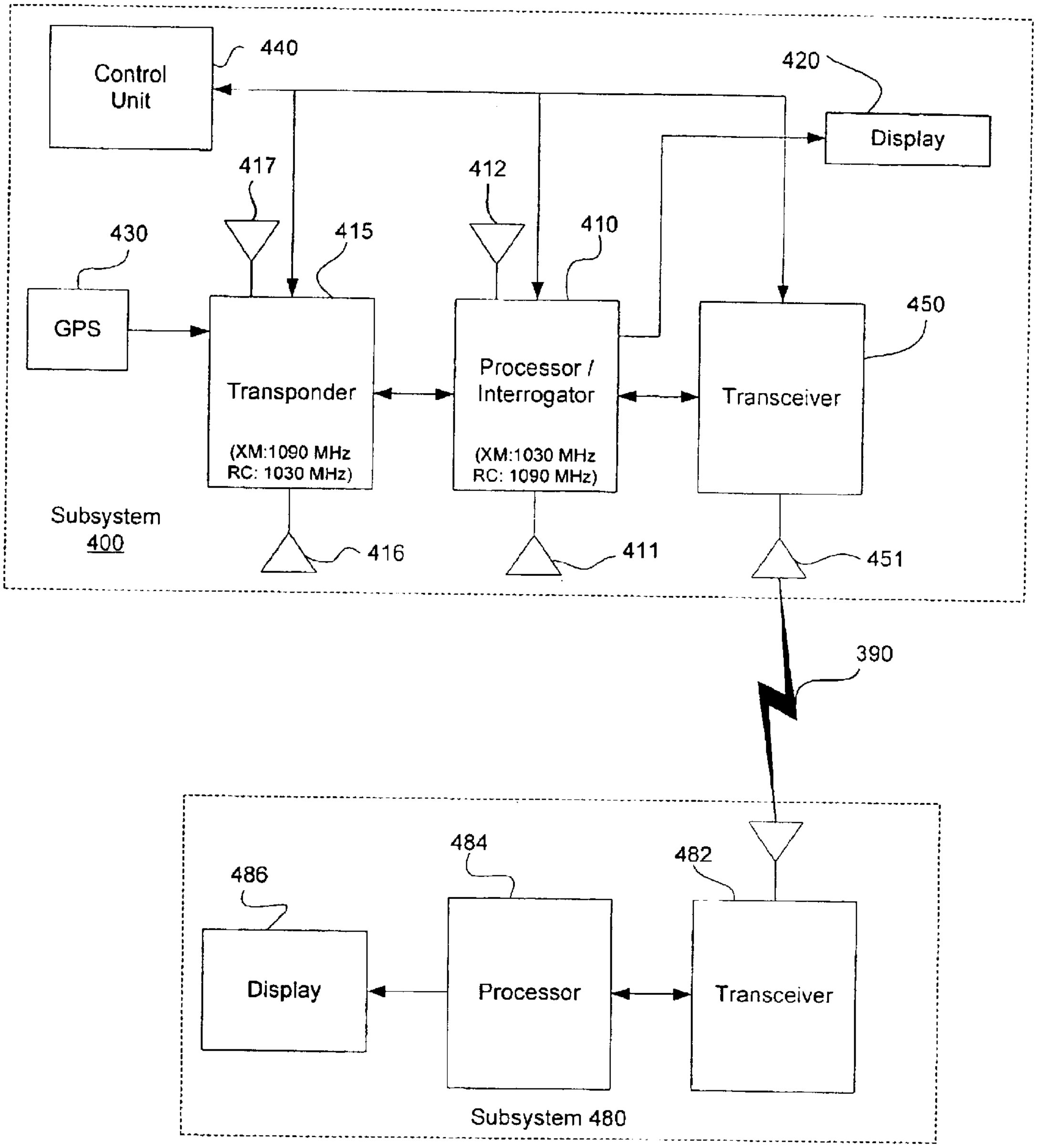
FIG. 4 is a block diagram illustrating components of a formation collision avoidance system according to a preferred embodiment of the invention.

FIG. 4 is a block diagram illustrating components of a formation collision avoidance system according to a preferred embodiment of the invention utilizing TCAS.

The inventive system is implemented in formation aircraft to enable select formation members to fly with TCAS in active surveillance mode while other members of the formation do not transmit interrogations (e.g., passive mode). The system is configured to network surveillance information between formation members having TCAS in active mode and formation members having TCAS in passive mode to: (i) prevent collisions between formation aircraft and non-formation aircraft; (ii) prevent collisions between the member aircraft in a formation; and (iii) both (i) and (ii).

Formation surveillance and collision avoidance systems are provided on each aircraft that may fly in a formation. System 400 is implemented on an aircraft that may actively interrogate surrounding air traffic and generally includes: (i) a collision avoidance processor and interrogator 410 for generating interrogations, processing replies to its interrogations, generating information to be displayed to a pilot and executing collision avoidance algorithms; (ii) a transponder 415 for receiving interrogations and transmitting replies; (iii) a global positioning system "GPS" receiver 430 for obtaining current navigational information; (iv) a transceiver 450 for establishing a communications link to receive/transmit networked surveillance information; (v) a control unit for selecting functionality of the respective components; and (vi) a display for displaying and tracking local air traffic and/or displaying TA/RAs to the pilot or crew. Any one of the foregoing components may be combined and implemented as a single component.

Transponder 415 is configured to communicate with the processor/interrogator 410 in a manner that interrogations are transmitted to surrounding air traffic and replies to the transmitted interrogations may be received at processor/interrogator 410 and vice versa at transponder 415.

Information received in reply to broadcast interrogations is also networked to other members in the formation through data transceiver 450 and its respective antenna 451. Information received in reply to interrogations is processed at 410 and when compared between its own aircraft and another aircraft's current positional information (e.g., provided by GPS receiver 430 and other on-board instruments) potential collision threats can be determined. Traffic display 420 is updated by processor 410 to display surrounding air traffic including formation and non-formation aircraft and/or provide TAs and RAs to the pilot.

Processor/interrogator 410 may be any device or combination of devices capable of performing the functions described herein. In a preferred embodiment of the invention, processor/interrogator 410 is a modified or augmented TCAS 2000 system available from Aviation Communications & Surveillance Systems (ACSS), an L-3 Communications & Thales Company, which incorporates FAA "Change 7" software. The TCAS 2000 system includes a RT 950/951 receiver/transmitter (R/T) unit and top directional antenna 412 and bottom directional or omni directional antennae 411. The R/T unit performs airspace surveillance and intruder tracking, generates traffic display symbology, computes threat assessment and collision threat resolution and provides coordination between its own aircraft and surrounding TCAS equipped aircraft to provide non-conflicting RAs. The R/T unit computes the bearing of an intruder from antennae 411 and 412, which are preferably AT 910 Top-Directional/Bottom-Omni Directional antennas, and determines the range by the time lapse between interrogation and reply from an intruder. In the preferred embodiment processor/interrogator 410 broadcasts on a frequency of 1030 MHz and receives replies on a frequency of 1090 MHz. In active mode, the R/T unit provides surveillance information to transceiver 450 for networking to members of the formation having TCAS in passive mode. In passive mode, the R/T unit provides processing means for tracking surrounding traffic and/or threat assessment based on received networked surveillance information. Tracking and threat assessments by the R/T unit in passive mode may also be based on ADS-B or other squitter information received independently of communications link 390.

Transponder 415 is any device or combination of devices capable of receiving an interrogation from another aircraft or ATC ground tracking station and transmitting a reply to the interrogation. As previously discussed, replies to interrogations may include the latitude and longitude of the aircraft's current position as well as other information including its identification (e.g., 24 bit Mode-S address). In the preferred embodiment, transponder 415 is an XS-950 or XS-950S/I Military Mode-S/IFF transponder having ground-based and airborne interrogation capabilities. Transponder 415 preferably includes ADS-B functionality and includes top and bottom ATC omni directional antennae 416 and 417 for transmitting/receiving information to/from other aircraft or ground based ATC systems. In the preferred embodiment, transponder 415 transmits on a frequency of 1090 MHz and receives on a frequency of 1030 MHz.

GPS receiver 430 may be any device or devices that provide current navigational data to system 400. GPS receiver 430 is coupled to transponder 415 to provide latitude and longitude coordinates of the aircraft for broadcast and/or to calculate potential collision threats (e.g., in passive mode to determine a relative position to lead aircraft 310 having active TCAS).

Transceiver 450 provides the layer for networking surveillance information to other aircraft in a formation. Transceiver 450 is preferably an RF transceiver operating on a frequency other than that of the transponder/TCAS interrogation and reply channels, typically 1030 MHz and 1090 MHz. However, transceiver 450 may be any type of wireless communication system operating on any frequency range. RF transceiver 450 is coupled to the processor 410 to provide networked surveillance data received from other formation members to processor 410 or transmit the same depending on whether the TCAS is in active mode or passive mode. The RF transceiver 450 of the preferred embodiment establishes network link 390 between other formation aircraft and transmits/receives data over network link 390 utilizing spread spectrum modulation. Transceiver 450 includes antenna 451 to transmit and/or receive the networked surveillance information. Antenna 451 is preferably an omni-directional or segmented directional antenna radiating on a non-ATC frequency (e.g., other than 1030 MHz and 1090 MHz).

Preferably, transceiver 450 is composed of equipment that already present on the aircraft. For example, military aircraft configured to fly in formations often have Station Keeping Equipment (SKE) used for keeping planes in formation position. The SKE used in this type of military aircraft, for example the C-130, communicate positional, range and control information between formation members for functions such as autopilot. SKE transmitter/receivers typically operate on frequencies between 3.1 to 3.6 GHz and includes a useable data transfer rates of 40 Kbps. Existing SKE is integrated with TCAS to network surveillance information over the existing SKE communication links between formation members (e.g., network link 390). When using SKE equipped aircraft, the present invention may be implemented by providing a software update for processor 410 and providing physical connectivity between the SKE and processor 410 and control unit 440. In the event an aircraft does not have SKE a separate transceiver 450 or the use of 1090 MHz ADS-B emissions of active lead aircraft surveillance data facilitates network link 390.

Transceiver 450 is connected to processor 410 using any type of communications bus. In the preferred embodiment, the existing SKE-243a is used and connected to processor 410 using two dual wire serial buses each providing serial communications between processor 410 and the SKE 450. The buses connecting the SKE to processor 410, as well as most connection in system 400 are preferably ARINC 429 data buses.

Control unit 440 provides information to transponder 415 relating to required display data such as altitude and speed, and controls function selection of transponder. 415 (e.g., transmission mode and reporting functions), processor 410 (e.g., passive mode, active mode), transceiver 450 and display 420. Control unit 440 also may include a processor for processing information outside of processor 410. In a preferred embodiment, control unit 440 is an ATC transponder and TCAS control unit implemented as an integrated menu-driven multi-function cockpit display unit or MCDU. An L-3 control panel or Gables control panel may also serve as control unit 440. Control unit 440 preferably controls other system components over a 1553 data bus.

Display 420 is one or more display units capable of displaying an aircraft's own position, displaying positions of other nearby aircraft (e.g., other formation members and surrounding ATC traffic) and/or displaying TAs and RAs generated by the TCAS usually compatible with ARINC 735a display bus protocols. Processor 410 provides surveillance and collision avoidance information to display 420 located in the cockpit of the aircraft. The collision avoidance information provided to display 420 can include any of the aforementioned information relating to tracking ATC aircraft and advisories as well as tracking formation aircraft. SKE display information or other information identifying and tracking the other formation members are also preferably displayed on display 420. Typically, TCAS equipped aircraft have two displays, a traffic display and an RA display. Block 420 in FIG. 4 may represent both traffic and RA displays if present in system 400. SKE equipped aircraft usually have a separate display for displaying formation positions. In a preferred embodiment of the invention a single display displays both SKE information and TCAS information. By coordinating and integrating available TCAS, ADS-B and SKE information in processor 410, symobology may be generated for displaying both formation and non-formation aircraft to a pilot in a uniform format on a single display device (whether or not the pilot's TCAS is in active mode or in passive mode). An example of integrated symbology displayed on a single display device is discussed further below in reference to FIG. 8.

Display 420, depending on the aircraft type and cockpit configuration, may be a radar display (including shared weather radar displays), Map and/or navigation displays, a flat panel integrated display, SKE display or other multifunction display, for example, an Electronic Flight Instrument System (EFIS) or Engine Indication and Crew Alerting System (EICAS) display as well as any combination of the foregoing.

FIG. 4 also shows a second subsystem 480 in communication with system 400 through network link 390. Subsystem 480 represents a formation collision avoidance system installed in another formation member aircraft. System 480 is depicted to receive networked surveillance information from actively interrogating systems, for example system 400. System 480 may be identical to system 400 or have less components if system 480 will not be transmitting interrogations. System 480 includes at least: (i) a receiver or transceiver 482 for receiving networked surveillance information over network link 390 from other formation members; (ii) a processor 484 for processing information received by transceiver 482; and (iii) a display 486 for displaying surrounding traffic and or providing warnings including TAs and RAs generated by processor 484 based on the networked surveillance information. While not shown, system 480 may also include a transponder for replying to interrogations from other aircraft and a GPS receiver for obtaining current navigational information to provide in response to interrogations and determine a position relative to formation members that are actively interrogating. The relative position is compared with the networked surveillance information at processor 484 to determine potential collision threats and track other aircraft. The components in subsystem 480 may be the same type of equipment as previously described with reference to system 400. For example, transceiver 482 may be an SKE receiver/transmitter unit already existing on the aircraft, etc.

While specific components have been described above with reference to preferred embodiments, the skilled artisan will recognize the present invention could be implemented in any number of hardware and software configurations depending on the equipment available and the functionality desired. Consequently, the systems of the present invention are not limited to any specific configuration discussed in reference to the preferred embodiments.

Surveillance and Collision Avoidance of ATC Aircraft

Figure 5:
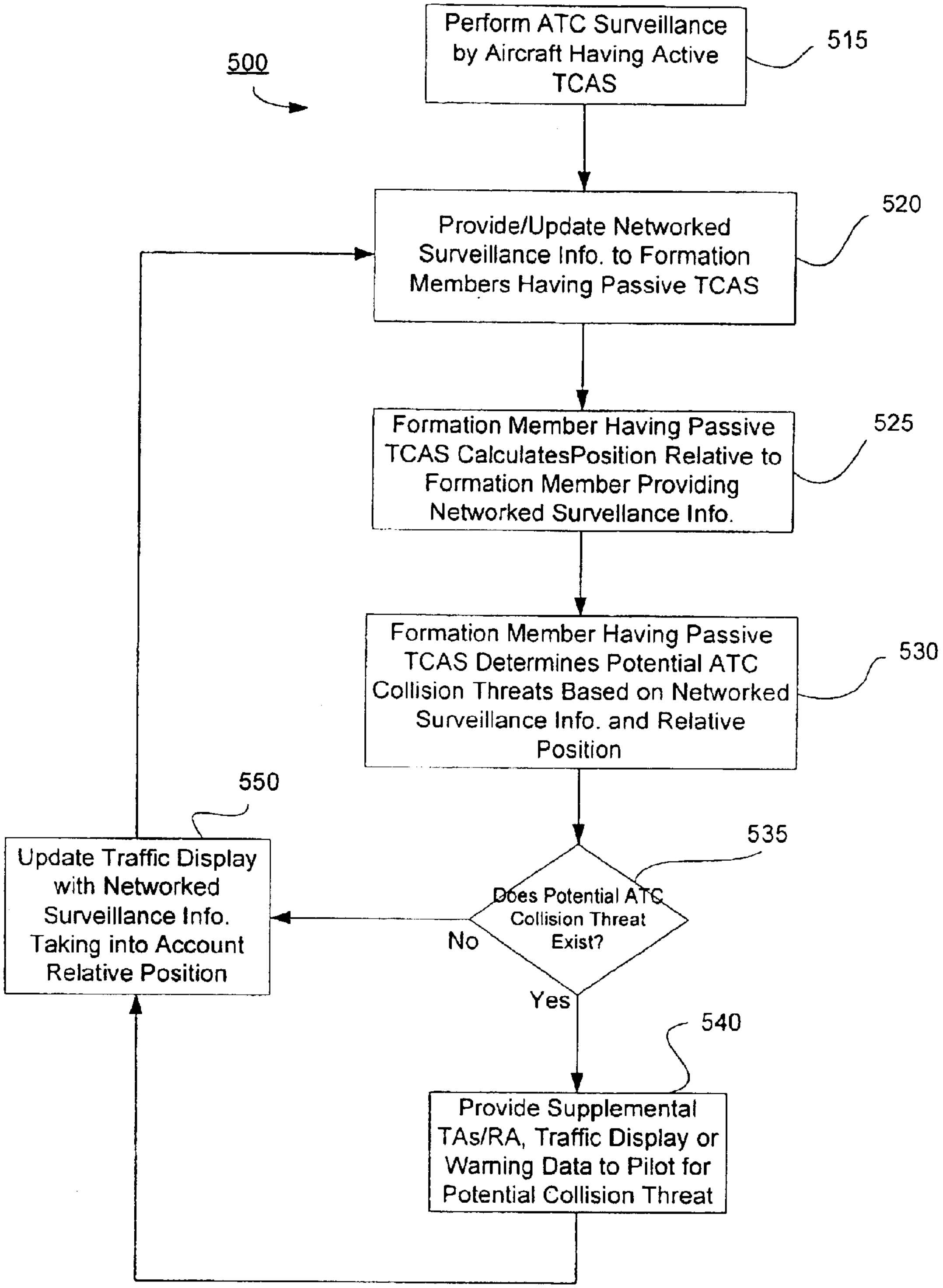
FIG. 5 is a flow chart detailing a method for formation collision avoidance according to a preferred embodiment of the invention.

A method for avoiding collisions between ATC aircraft and formation members having TCAS in passive mode will be described with reference to FIG. 5. As used herein, an ATC aircraft means an aircraft that are not part of the formation. When multiple TCAS equipped aircraft are flying in a formation, at least one formation member is actively interrogating surrounding aircraft ("active TCAS" or "TCAS in active surveillance mode"), while the remaining members of the formation are not interrogating ("passive TCAS" or "TCAS in passive mode"). The determination and control of which members in a formation will have active TCAS and which members in the formation will have passive TCAS may be automatically configured taking into consideration position of the formation members in the formation, a distance between members in the formation and other dynamic factors. The determination of which members will have active TCAS may also be based on which members are, or will be, flying in lead positions and the type of equipment available in each aircraft.

The formation member or members that are actively interrogating using their TCAS obtain information on surrounding ATC aircraft 515 through interrogate-reply protocols. When the actively interrogating formation member(s) obtains any new or updated ATC traffic information (e.g., replies or broadcasts from surrounding aircraft), it is networked to the members of the formation having passive TCAS 520 through a communications link (e.g., comm. link 390).

All members of the formation preferably have a global positioning system (GPS) receiver on board that provides latitude and longitude coordinates for their aircraft. The coordinates of the actively interrogating formation member (s) may be provided as part of the networked surveillance information so that formation members having passive TCAS may determine their position relative to that of the actively interrogating formation member(s) 525. This capability is already available in aircraft equipped with SKE. In SKE equipped aircraft, each aircraft in a formation may continually track its position, speed, altitude and bearing relative to the other members of the formation.

Positional and identification information on formation members may also be exchanged via ADS-B information broadcast from the formation members if so equipped. Each formation member having passive TCAS may determine its own relative position, speed, altitude, and vertical speed and compare this information with the networked surveillance information on ATC aircraft provided by the formation member(s) having active TCAS. By this comparison, a formation member having its TCAS in passive mode can determine whether a potential collision threat exists with ATC aircraft 535. In this embodiment, a threat may potentially exist when the TCAS determines that a potential collision, or near collision may occur between the formation member having passive TCAS and a non-formation aircraft in the ATC environment. This is referred to as an "ATC collision threat."

If a potential ATC collision threat does not exist, the traffic display on the formation member having TCAS in passive mode is updated 550 to reflect the surrounding ATC aircraft based on the networked surveillance information and its own relative position 550. The TCAS in passive mode continues to obtain networked surveillance information over the communications link and steps 520-535 may be continuously repeated.

If the passive TCAS determines that a potential ATC collision threat exists, several options are possible depending on the settings of the TCAS. For example, the passive TCAS may provide TAs/RAs or other warning information to enable pilot awareness and/or resolution of the potential ATC collision threats. It should be noted that RAs generated by a TCAS in passive mode might not be coordinated with the RAs of oncoming ATC traffic without actively transmitting signals. Consequently, for RAs, it is recommended that the TCAS be switched to active surveillance mode for such coordination to occur. The pilot is made aware of the potential ATC collision threat 540 and the system can remain in passive mode or the system, automatically or by pilot initiative, may be switched to active surveillance mode (i.e., begin transmitting interrogations) 548.

If the system remains in passive mode 545 the traffic display is updated based on the networked surveillance data and calculated relative position 550.

Figure 6:
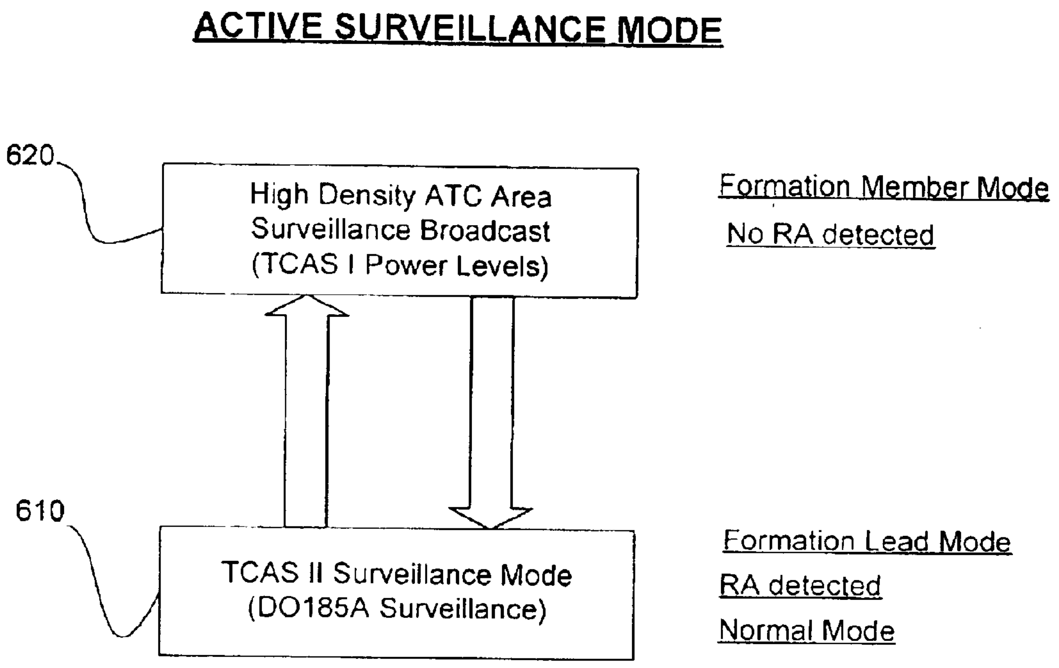
FIG. 6 is a block diagram illustrating interrogation levels for active surveillance mode according to one embodiment of the invention.

An example of active surveillance mode is illustrated in FIG. 6 and may include two different levels of interrogation as shown in FIG. 6: (1) TCAS II surveillance 610 (e.g., DO185A surveillance); and (2) hi-density surveillance 620 (e.g., TCAS I power levels). TCAS II surveillance 610 is used: (i) when a formation member's TCAS is set to actively interrogate ATC aircraft in order to provide networked surveillance information to formation members having passive TCAS. (e.g., TCAS is set to formation lead mode or normal mode); (ii) when RAs are detected by active and passive TCAS in the formation (this is done to allow coordination of RAs between ATC aircraft and formation members); and (iii) when any TCAS in active surveillance mode is in a low density ATC environment.

Hi-density surveillance 620 is used when formation members having TCAS in passive mode switch to active surveillance mode in a high density ATC environment and no RAs have been generated (e.g., TCAS is set to a formation member mode). It is preferable that the respective TCAS of the formation members include a formation member mode wherein the collision avoidance algorithms distinguish between the surrounding formation members and ATC traffic. This is to avoid TAs and RAs from being generated against other members of the formation when a formation member is in active mode or switches the TCAS to active mode.

The determination of a potential ATC collision threat 535 occurs when a threshold altitude and range of an Intruder is exceeded or a time to closure in altitude or range of the intruder is exceeded based on the networked surveillance information. This threshold is variably determined in the processor 410, 484 based on factors that include the current speed, altitude and vertical speed of the formation member having TCAS in passive mode. An example scenario for this threshold value could include the TA threshold value of DO185A of 850 feet altitude and time to penetration of range of 1nm in 45 seconds.

The warning of a potential ATC collision threat provided to the pilot or flight crew 540 may be an audible and/or visual warning that provides data pertaining to the ATC aircraft that may be a threat. This data may include, but is not limited to, an estimated closure time of the ATC aircraft and/or a distance to the ATC aircraft.

When an RA is detected by a formation member's passive TCAS, the TCAS is preferably switched to active surveillance mode so that RAs may be coordinated between individual members of the formation, if necessary, and between formation members and the ATC aircraft.

The collision avoidance algorithms of each formation member's TCAS preferably track identification and position of each aircraft in the formation using SKE data exchanged over the wireless communications link or using ADS-B information. This is desirable to prevent a formation member's TCAS from generating an RA to avoid a collision with ATC aircraft which conflicts with flight paths other members of the formation. Tracking formation members is also important to prevent RAs from being generated against other members of the formation as previously discussed.

Surveillance and Collision Avoidance Between Formation Members

Currently SKE can only provide surveillance on similarly equipped SKE aircraft. As described previously, a communications link (e.g., SKE link) may be combined with TCAS to provide members having TCAS in passive mode the ability to track and perform collision avoidance calculations on surrounding ATC aircraft.

In another embodiment of the present invention, networked surveillance information may be used to not only monitor ATC aircraft, but also to monitor other aircraft in the formation.

Formation aircraft may have SKE or ADS-B systems to affect this end. In addition to monitoring ATC aircraft, the surveillance and collision avoidance methods and systems in this embodiment, process available SKE and ADS-B information to continually track other formation members on the same traffic display as the tracked ATC aircraft. This information may also be used to determine whether potential collision threats exist between formation members (potential formation collision threats).

Potential collision threats between formation members preferably generate a blunder alert rather than a Resolution Advisory. Blunder alerts are audio and/or video indicia that inform the pilot of a formation aircraft when the potential for collision with another formation aircraft is possible or likely.

There may be two types of blunder alerts: (1) a blunder proximity alert; and (2) a blunder acceleration alert. A blunder proximity alert occurs when a minimum threshold distance ($N_{th}$) between two formation members is reached (e.g., Distance to another formation member $<(N_{th})$ ft.), or when a time to penetration Tau ($\tau$) of a minimum threshold distance, is reached (e.g., Time until another formation member reaches threshold distance $<(\tau)$). An example for ($N_{th}$) and ($\tau$) is 1000 ft. and 30 seconds to 1000 ft., respectively.

A blunder acceleration alert occurs when relative acceleration of a formation member within a certain distance of another formation member exceeds a certain amount ($g_b$). For example, two formation members within 1000 ft of each other may have a threshold acceleration limit ($g_b$) of 0.3 g. This means that when an acceleration of a first member of the formation is greater than 0.3 g relative to the acceleration of a second formation member that is within 1000 ft of the first formation member, a blunder acceleration alert will inform the pilots of the first and second aircraft of the potential danger.

When either of these blunder alerts are presented, the formation aircraft pilots preferably take steps to resolve the potential formation collision threat.

Figure 7:
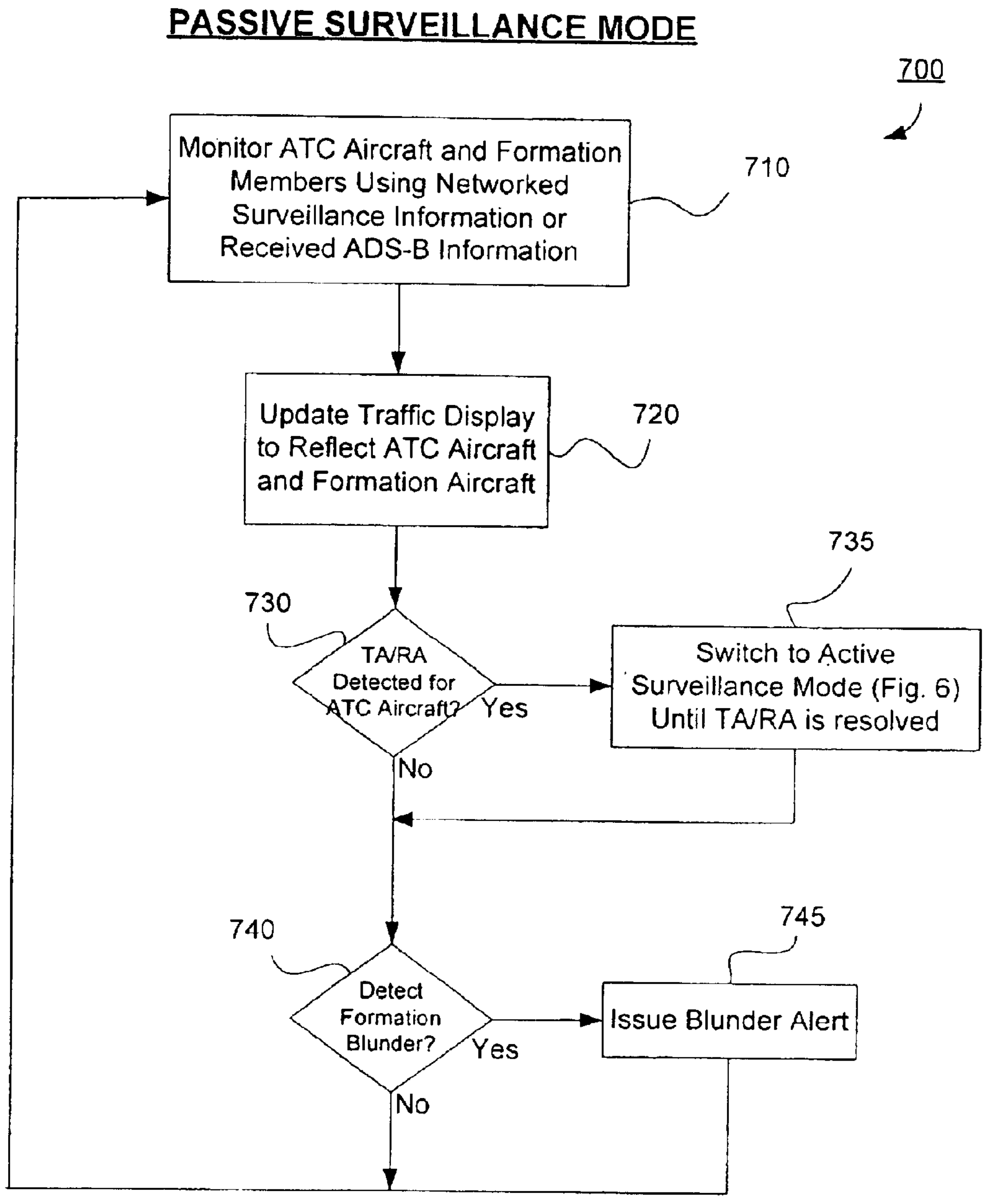
FIG. 7 is a block diagram illustrating a method for passive surveillance according to one embodiment of the invention.

A preferred method of formation surveillance and collision avoidance will now be described with reference to FIG. 7. Method 700 illustrates the sequence of operations for a surveillance and collision avoidance system in passive mode according to one embodiment of the invention. The system in passive mode monitors ATC aircraft and other formation members using a combination of available information 710. For example, monitoring of ATC aircraft is performed by evaluating information provided over the communications link (networked surveillance information) from formation members having systems in active mode. Information about surrounding ATC aircraft may also be obtained by receiving ADS-B information from the surrounding ATC aircraft.

Monitoring of other formation members is performed based on information exchanged over the communications link between formation members (e.g., SKE information). Receiving ADS-B information broadcast by the formation aircraft that are so equipped may also be used for monitoring other formation members. If a formation member does not have SKE or ADS-B, that formation member may provide its positional and identification information in reply to interrogations from formation members in active mode. This information may then be communicated to other members of the formation in passive mode using the communications link.

Surveillance and collision avoidance systems in passive mode update cockpit traffic displays to display current traffic conditions 720 based on the foregoing received information. The displayed traffic may include identification of the surrounding aircraft (e.g., distinguishing between formation members and ATC aircraft), the respective positions of the surrounding aircraft, and other information indicating the dynamic features of the surrounding aircraft (e.g., altitude, vertical speed, etc.).

Systems in passive mode also detect whether any traffic advisories or resolution advisories are present based on the networked surveillance information and/or ADS-B information received from other aircraft 730. TAs and RAs are indicated to a pilot by visual and/or aural means. If a TA or RA is detected, the system may be automatically or manually switched to active surveillance mode 735. Active surveillance is preferably performed in accordance with the example shown in FIG. 6. Once the conflict is resolved, the surveillance and collision avoidance system may be switched back to passive surveillance mode. It should be recognized that the traffic display might indicate TAs and RAs to the pilot by any appropriate display indicia, including for example, the color of the symbol displayed on the traffic display, a textual indication, or combination thereof.

The system also checks for potential collision threats between formation members based on the received information (e.g., networked surveillance information and/or ADS-B info.) 740. If a threat of collision between formation members is present, a blunder alert, preferably of the type previously discussed, may be issued to the pilot or flight crew 745. The pilot resolves the blunder alert and the system continues to operate in passive mode. While method 700 is illustrated as a sequential diagram, the skilled artisan will recognize that steps 710–745 may be performed in any sequence, concurrently with one another, and/or more than once during passive surveillance. For example, updating the traffic display 720 may be continuously and periodically performed throughout execution of method 700.

Figure 8:
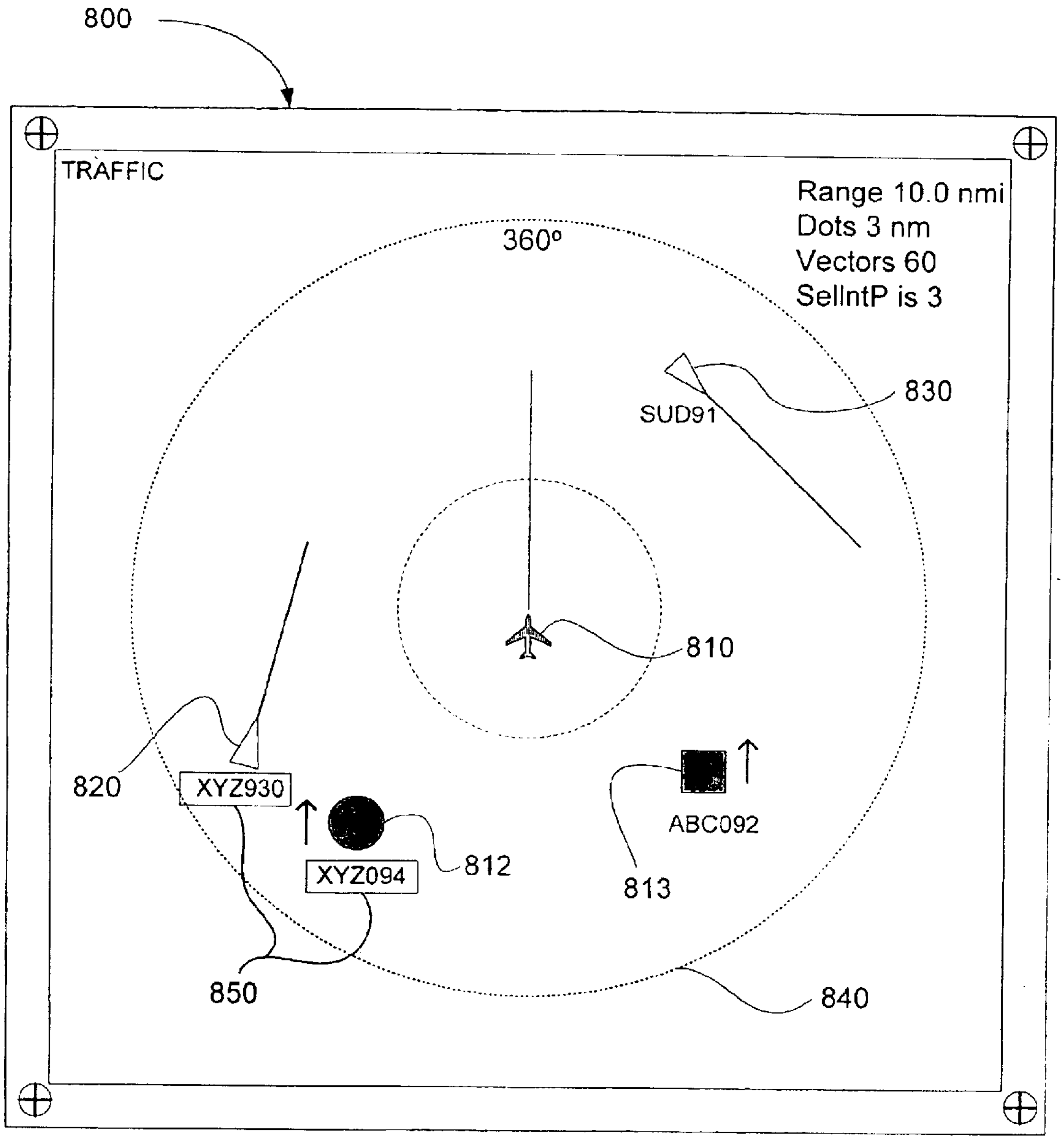
FIG. 8 is a block diagram illustrating surveillance traffic displayed on an integrated display according to an embodiment of the invention.

FIG. 8 illustrates examples of display symbology that may be displayed on an integrated display device 800 according to one embodiment of the present invention. Display 800 depicts symbol 810 centered in the traffic display and reflects the position and heading of the aircraft containing display 800. Symbols 812 and 813 illustrate the positions and identification of aircraft flying in formation with the aircraft containing display 800. TCAS performs surveillance on transponder-equipped aircraft while SKE performs surveillance on SKE equipped aircraft (e.g., other aircraft in the formation). Utilizing the systems and methods disclosed herein, a combined list of SKE and TCAS intruders may be displayed on a single display device wherein common intruders detected by both systems (e.g., the same aircraft detected by both TCAS and SKE systems) may be determined as redundant and duplicative display eliminated.

In one embodiment of the invention, the TCAS system receives intruder tracks from the SKE system and generates the symbology for display of both SKE and TCAS on a single display. In an alternate embodiment, the SKE system received intruder tracks from the TCAS system and the SKE system drives the display device 800. In yet an additional embodiment an independent device, for example display 800 or a separate symbol generator integrates the information between TCAS and SKE systems to display all traffic on a single display device in a uniform format.

Symbols 820 and 830 illustrate ATC non-formation aircraft within the range setting 840 of display 800. Symbols 812 and 813 for formation aircraft are preferably distinguished from non-formation aircraft symbology 820, 830 so that a pilot of the aircraft represented by symbol 810 may readily distinguish between both formation and non-formation aircraft. Distinguishing between formation aircraft and non-formation aircraft on display 800 may be performed in any manner. For example, symbols 812 and 813 may be displayed: in a different color, surrounded by a separate geometric shape, to flash or blink, or any other manner to graphically distinguish them from symbols 820 and 830 representing non-formation aircraft. Display 800 may distinguish between, among others, SKE military formation (cooperative) members, ADS-B military cooperative members (e.g., formation members without SKE) and commercial intruders.

The formation and non-formation aircraft may be displayed with symbology indicating the type of surveillance equipment operating on board each aircraft (e.g., SKE only, SKE+transponder, or transponder only). While all aircraft are equipped with transponders, due to operational reasons, they may be turned off or be in a no transmit mode. A military aircraft with a silent transponder may be designated with an "SKE only" traffic symbol or any other graphical representation designated for such categorization.

Mode S transponders have unique identification fields that may also be utilized by the SKE system to identify and display formation members that are not transmitting through the transponder in a similar format as formation and ATC aircraft that are transmitting with their respective transponders. These identification fields may be displayed adjacent to, on or near each displayed aircraft as data tags 850 on display 800 (see FIG. 8). In this manner, each target on display 800 may be uniquely identified in a standardized identification format, even though certain aircraft may have their transponders turned off. Other data derived from ADS-B or SKE equipment such as velocity vectors, cross track error, and acceleration may be integrated into the features of display 800 in addition to standard display features of range, bearing and altitude.

Unless contrary to physical possibility, the inventors envision the methods and systems described herein: (i) may be performed in any sequence and/or combination; and (ii) the components of respective embodiments to be combined in any manner.

Although been described preferred embodiments of this novel invention, many variations and modifications are possible and the embodiments described herein are not limited by the specific disclosure above, but rather should be limited only by the scope the appended claims.

What is claimed is:

1. An apparatus for displaying air traffic symbology, the apparatus comprising:

an interface that receives a first signal;

a memory that includes indicia of symbology for display;

a processor that provides a second signal in accordance with the indicia of symbology selected in accordance with the first signal; and a monitor, responsive to the processor, that displays a presentation in accordance with the second signal, the presentation comprising:

(1) a first symbol for a proximate formation aircraft; and (2) a second symbol for a proximate non-formation aircraft, wherein the first symbol differs in appearance from the second symbol.

2. The apparatus of claim 1 adapted for receiving the first signal from a Traffic Alert and Collision Avoidance System (TCAS).

3. The apparatus of claim 1 adapted for receiving the first signal from a Station Keeping Equipment.

4. The apparatus of claim 1 adapted for receiving the first signal from time to time from each of a Traffic Alert and Collision Avoidance System (TCAS) and a Station Keeping Equipment.

5. The apparatus of claim 1 wherein the presentation associates at least one of the first symbol and the second symbol with a respective type of surveillance equipment operating on board the respective aircraft.

6. The apparatus of claim 5 wherein the type corresponds to at least one of: station keeping equipment only, station keeping equipment with transponder, and transponder only.

7. The apparatus of claim 1 wherein the presentation further comprises for each symbol indicia of identification of the corresponding aircraft.

8. The apparatus of claim 1 wherein:

the presentation associates at least one of the first symbol and the second symbol with a respective type of surveillance equipment operating on board the respective aircraft;

the presentation further comprises for each symbol indicia of identification of the corresponding aircraft; and the indicia of identification is presented in a same format for each type.

9. The apparatus of claim 1 wherein the presentation further associates with at least one of the first symbol and the second symbol at least one of a velocity vector, a cross track error, and an acceleration.

* * * * *